United States Patent Office 2,887,485
Patented May 19, 1959

2,887,485
NEW CYCLIC UREA DERIVATIVES

Robert S. Yost, Oreland, Pa., assignor to Rohm & Haas Company, Philadelphia, Pa., a corporation of Delaware No Drawing. Application January 6, 1956
Serial No. 557,656

10 Claims. (Cl. 260—251)

This invention is concerned with N-(halogenoalkyl)-N,N'-alkyleneureas and to methods of producing them. This application is a continuation-in-part of my copending application Serial No. 500,300, now Patent No. 2,840,566, filed April 8, 1955, and a continuation-in-part of my copending application Serial No. 533,510, filed September 9, 1955, now Patent No. 2,840,561.

The novel compounds of the present invention have the structure of the general Formula I:

(I) 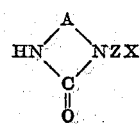

where A is an alkylene group having 2 to 3 carbon atoms of which at least two extend in a chain between the adjoined N atoms, Z is an alkylene group having 2 to 18 carbon atoms of which at least two extend in a chain between the N and X atoms, and X is a halogen selected from the group consisting of chlorine and bromine.

The compounds of Formula I may be made by the reaction of thionyl halides of the Formula II with a compound of Formula III:

(II) SOX (III) 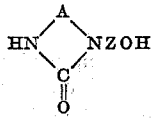

where X, A, and Z are as defined above. The thionyl halide and the compound of Formula III may be used in approximately equimolar amounts and the reaction is preferably effected in a solution of the compound of Formula III, such as in chloroform. Preferably the thionyl halide is added gradually. For example, when the reaction involves a batch containing about two moles of a compound of Formula III, the thionyl halide may be added over a period of two hours. Reaction is preferably effected at a temperature of 30° to 110° C. Advantageously, it may be carried out with the solvent at reflux, in the case of chloroform, refluxing occurring at a temperature of about 58° to 66° C. After completion of the addition of the thionyl halide, the solvent, such as the chloroform, may be gradually distilled while introducing toluene until the temperature in the vessel reaches about 105° to 109° C. It is then refluxed for about 20 hours in the toluene. The product of Formula I is usually soluble in the hot toluene which is cooled to about 5° to 10° C. or lower to precipitate the compound of Formula I. The precipitated product may then be filtered and, if desired, washed with cold toluene. It is then air-dried or dried under a vacuum at room temperature. Instead of chloroform, other solvents, such as carbon tetrachloride and ethylene dichloride, may be used; and in place of toluene, other non-polar solvents, such as benzene, xylene, or the like may be used.

The compounds of Formula III may be made in various ways described in U. S. Patent 2,727,019. For example, as there disclosed, urea may be condensed with a hydroxyalkylaminoalkylamine, such as any one of the following:

V(a) $HOCH_2CH_2NHCH_2CH_2NH_2$
V(b) $HOCH_2CH_2NHCH_2CH_2CH_2NH_2$
V(c) $HOCH_2CH_2NHCH(CH_3)CH_2NH_2$
V(d) $HOCH(CH_3)CH_2NHCH_2CH_2NH_2$
V(e) $HOCH(CH_3)CH_2NHCH_2CH_2CH_2NH_2$
V(f) $HOCH_2CH_2CH_2NHCH_2CH_2NH_2$
V(g) $HOCH_2CH_2CH_2NHCH(CH_3)CH_2NH_2$
V(h) $HO(CH_2)_4NHCH_2CH_2NH_2$
V(i) $HO(CH_2)_5NHCH_2CH_2NH_2$
V(j) $HO(CH_2)_{10}NHCH_2CH_2NH_2$
V(k) $HOCH(C_6H_5)CH_2NHCH_2CH_2NH_2$
V(l) $HOCH(C_6H_5)CH_2NHCH(CH_3)CH_2NH_2$
V(m) $HOCH(CH=CH_2)CH_2NHCH_2CH_2NH_2$
V(n) $HOCH(CH=CH_2)CH_2NHCH(CH_3)CH_2NH_2$
V(o) $HOCH(C_6H_{13})CH_2NHCH_2CH_2NH_2$
V(p) $HOCH(C_8H_{17})CH_2NHCH(CH_3)CH_2NH_2$
V(q) $HOCH(C_{16}H_{33})CH_2NHCH_2CH_2NH_2$

V(r) 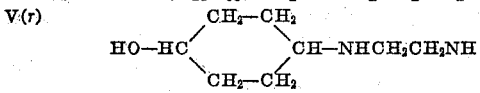

The reaction with urea may be effected by mixing one of the above hydroxy-diamines with an approximately equimolecular weight of urea and heating the mixture at sufficient temperature to evolve ammonia. Generally, temperatures may be between 200° to 210° C. Usually the reaction runs in two temperature ranges; initial evolution of ammonia occurring at 110° to 150° C., and the completion of the evolution of ammonia being effected at temperatures of 150° to 200° C.

The compounds of the present invention are generally solids to viscous liquids depending primarily upon the size of the alkylene substituent Z. Those compounds of Formula I having fairly high molecular weight, especially those in which the group Z has 12 to 18 carbon atoms are highly hydrophobic and, when applied to textiles, leather, and paper, impart water-repellency thereto and at the same time exert more or less softening and lubricating action. They are useful components of shoe polishes as well as other dressing or finishing material for paper, textiles, and leather products in general. Any of the compounds of Formula I may first be preliminarily condensed with aldehydes, and especially formaldehyde, to form alkylolated, and especially methylolated, derivatives which react with cellulosic and proteinaceous materials, especially textile fabrics of cellulose including cotton, viscose rayon, cuprammonium cellulose rayon or cellulose derivatives such as ethers and esters of cellulose, including ethyl cellulose, methyl cellulose, hydroxyethyl cellulose, cellulose acetate, and casein, soyabean protein, alpha-protein, and so on. Instead of first reacting the aldehyde with the compound of the invention, the aldehyde may be applied together with such compound or immediately before or after. In either system, completion of the condensation to an infusible and insoluble condition is effected by baking or curing at elevated temperatures, e.g. from 220° F. to 450° F. or higher for a time period of 30 seconds to 30 minutes or more, the higher the temperature the shorter the time or vice versa. The curing may be facilitated or accelerated by an acidic catalyst applied with, before, or after the application of the mixture of the aldehyde and the compound of Formula I or its aldehyde condensation product. In this fashion, the textiles or other articles may have imparted thereto, improved water-repellency, and improved resistance to creasing, crushing, and shrinkage.

The compounds of Formula I are also useful for producing quaternary ammonium compounds in the manner described in my co-pending application Serial No. 500,300 supra (2,840,566) and in my application entitled "Quaternary Ammonium Compounds," Serial No. 557,654, filed on even date herewith, now Patent No. 2,840,546.

In the following examples, which are illustrative of the invention, the parts are by weight unless otherwise indicated:

Example 1

In a reaction vessel fitted with mechanical stirrer, thermometer, dropping funnel and reflux condenser are placed 260 parts of N-(β-hydroxyethyl)-N,N'-ethyleneurea (obtained from the condensation of urea with the compound of Formula V(a) above) and 600 parts of anhydrous chloroform. The mixture is heated to reflux and 238 parts of purified thionyl chloride is added dropwise over a period of two hours. Reflux is maintained by the heat of reaction for most of this period. The chloroform is then distilled out of the mixture while 348 parts of anhydrous toluene is added at approximately the same rate at which the chloroform is distilled. Distillation is continued until the vapor temperature reaches 110° C. The mixture is refluxed for sixteen hours and then is chilled in an ice bath. The product is precipitated and is filtered, washed with cold toluene, and dried at 60° C. to give 268 parts (a 90% yield) of N-(β-chloroethyl)-N,N'-ethyleneurea, M.P. 81.5° to 82° C. Another name for this compound is 1-(β-chloroethyl)-imidazolidinone-2. One recrystallization from toluene gives a colorless, crystalline product melting at 84.0° to 85.0° C.

*Analysis.*—Calculated for $C_5H_9ON_2Cl$: C, 40.41%; H, 6.11%; N, 18.86%; Cl, 23.86%. Found: C, 40.62%; H, 6.05%; N, 18.90%; Cl, 23.26%.

Example 2

The procedure of Example 1 is repeated substituting 316 parts of N-(γ-hydroxypropyl)-N,N'-trimethyleneurea for the urea derivative there used. N-(γ-chloropropyl) N,N'-trimethylene-urea is the product obtained. Another name for this compound is 1-(γ-chloropropyl)-tetrahydro-pyrimidinone-2.

Example 3

An 88 yield of 1-(β-chloropropyl)-5-methyl-imidazolidinone-2 is obtained by repeating the process of Example 1 substituting 316 parts of 1-(β-hydroxypropyl)-5-methyl-imidazolidinone-2 for the urea derivative therein used.

Example 4

The following chloroalkyl cyclic ureas are obtained by repeating the process of Example 1 with substitution for the hydroxyalkylurea used therein an equivalent molar quantity of the hydroxyalkyl cyclic urea obtained by condensation of urea with the N-hydroxyalkylalkylenediamine of the formula given after the name of the product compound:

(*a*) 1-(β-chloroethyl)-tetrahydro-pyrimidinone-2 (from V(*b*)).
(*b*) 1 - (γ-chloropropyl) - 5 - methyl-imidazolidinone-2 (from V(*g*)).
(*c*) 1-(4-chlorobutyl)-imidazolidinone-2 (from V(*h*)).
(*d*) 1-(10-chlorodecyl)-imidazolidinone-2 (from V(*j*)).
(*e*) 1-(β-chlorodecyl)-5-methyl-imidazolidinone-2 (from V(*p*)).

Example 5

The products of parts (*d*) and (*e*) of Example 4 are applied to the uppers of leather boots and impart a lubricous feel and water-repellent finish thereon.

Example 6

A mixture of 90 parts of 37% formaldehyde, 149 parts of N-(β-chloroethyl)-N,N'-ethyleneurea in 270 parts of water containing 1 part of oxalic acid is applied to a rayon fabric, dried and then heated to 300° F. for five minutes. The treated fabric has a crisp hand and is markedly improved in resistance to shrinkage.

It is to be understood that changes and variations may be made without departing from the spirit and scope of the invention as defined in the appended claims.

I claim:
1. A compound having the formula:

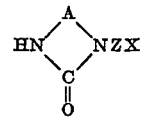

where A is an alkylene group having 2 to 3 carbon atoms of which at least two extend in a chain between the adjoined N atoms, Z is an alkylene group having 2 to 18 carbon atoms of which at least two extend in a chain between the N and X atoms, and X is a halogen selected from the group consisting of chlorine and bromine.

2. 1-(β-chloropropyl)-5-methyl-imidazolidinone-2.
3. 1-(4-chlorobutyl)-imidazolidinone-2.
4. 1-(β-chlorodecyl)-5-methyl-imidazolidinone-2.
5. 1-(β-chloroethyl)-imidazolidinone-2.
6. 1-(γ-chloropropyl)-tetrahydro-pyrimidinone-2.
7. The method of making a compound as defined in claim 1 which comprises reacting a thionyl halide of the formula SOX where X is a halogen selected from the group consisting of chlorine and bromine with a cyclic compound of the formula:

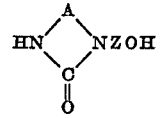

where A is an alkylene group having 2 to 3 carbon atoms of which at least two extend in a chain between the adjoined N atoms, and Z is an alkylene group having 2 to 18 carbon atoms, the reaction being effected by mixing the thionyl halide with the cyclic compound in a solvent for the latter which is inert to the thionyl halide at a temperature in the range of about 30° to 110° C.

8. The method as defined in claim 7 in which the solvent is chloroform and the reaction is effected at reflux.

9. The method as defined in claim 7 in which the solvent initially present is chloroform and another solvent of higher boiling point is gradually added and the chloroform is distilled off by raising the temperature gradually up to about 110° C.

10. The method as defined in claim 7 in which the solvent initially present is chloroform, toluene is gradually added, and the chloroform is distilled off by raising the temperature gradually up to about 110° C.

No references cited.